Figure 1:
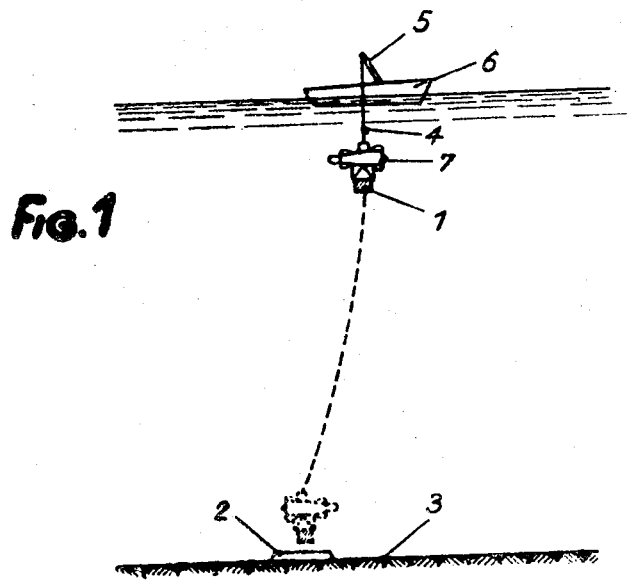

United States Patent

[11] 3,633,529

| [72] | Inventor | Francisco M. Serrano<br>Paris, France |
|---|---|---|
| [21] | Appl. No. | 1,487 |
| [22] | Filed | Jan. 8, 1970 |
| [45] | Patented | Jan. 11, 1972 |
| [73] | Assignee | Compagnie Francaise des Petroles<br>Paris, France |
| [32] | Priority | Jan. 17, 1969 |
| [33] | | France |
| [31] | | 6900779 |

[54] MOBILE CARRYING SYSTEM FOR DEPOSITING LOADS ON THE OCEAN BOTTOM
7 Claims, 2 Drawing Figs.

[52] U.S. Cl............................................. 114/16 R,
 61/69
[51] Int. Cl............................................ B63g 8/00
[50] Field of Search................................ 114/16 R,
 16 E; 61/69

[56] References Cited
UNITED STATES PATENTS

| 2,981,073 | 4/1961 | Robinson................ | 61/69 |
| 3,381,485 | 5/1968 | Crooks et al............ | 61/69 |

*Primary Examiner*—Trygve M. Blix
*Attorney*—Sughrue, Rothwell, Mion & Macpeak

ABSTRACT: A submarine delivery system for carrying and depositing heavy loads at precise locations on the ocean bottom. A self-powered and steerable submarine vehicle carries the load to be deposited and embodies sensing means for locating the target or delivery area. The control system for the submarine may be entirely self-contained or control signals may be supplied by a surface vessel linked to the submarine by a support and electrical power and communications cable.

MOBILE CARRYING SYSTEM FOR DEPOSITING LOADS ON THE OCEAN BOTTOM

This invention relates to a carrying system for depositing in a precise place on the ocean bottom, any loads which may weigh several tons, especially loads that can be used in submarine drilling, said system making it possible to reduce or eliminate the many approach maneuvers which have so far been inevitable because of the imprecision in the guidance of loads from the surface of the ocean down to the bottom.

The operation of depositing a load on the ocean bottom has heretofore been performed by simply having a ship approach the site where the load was to be deposited, after which the load was lowered with the help of a cable. Sonar spotting means were used to determine the distance between the load and the site selected, and the ship was maneuvered accordingly. These maneuvers become particularly lengthy since ocean currents must be taken into account and because the ship itself is subjected to movements due to waves, tides and the winds.

The object of the invention is to provide a mobile carrying system for the precise and rapid deposit of loads on the ocean bottom, even at great depth, characterized by the fact that it involves a surface vessel and a submarine load-carrying unit connected to said vessel by a carrying cable, the unit here involving at least one means of propulsion, a means of orientation, and a means of load fixation.

The first advantage of such a system is that it eliminates the long and heavy cable which supported the load from the carrying ship, in the prior art, the cable here being replaced by a submarine device which supports and carries the load and which is provided with its own propulsion means. In this way the precision of maneuvering the load close to its target is considerably increased, while the submarine unit moves at a level near the ocean bottom.

Another advantage of this system is that it makes the load support device play only a moving role with respect to the horizontal displacement of the load while the ship only supports the weight of the load and the device. The device can thus be lightweight since it does not involve any means of its own that would enable it to dive or to surface, while the load transported may be quite considerable.

Another object of the invention is to provide a mobile carrying system for the precise depositing of a load on the ocean bottom, according to which the surface vessel is equipped with apparatus for telemetry and for the spotting of zones situated on the ocean bottom, the means for the orientation of the submarine device being remote-controlled by the ship.

The device does not have to involve a special enclosure for an operator to watch the entire maneuver and it suffices only for the ship to approach the target spotted by its own instruments, and then to operate a submarine device by remote control, said device being carried by the cable that links it to the ship, after which the ship is precisely positioned straight above the place spotted by the ship. This maneuver can be rapidly and easily performed while the operation is protected from any disturbances coming from the currents and the surface waves.

It may happen that the ocean bottom, instead of presenting a flat area has a certain relief, necessitating a regulation of the length of the cable connecting the device to the ship during the approach to certain sites or during the transport of a load from one side to the other.

Another object of the invention is to provide a system of the type described above, wherein the surface vessel has telemetry apparatus for the evaluation of its distance to an object and to the ocean bottom, as well as means for the regulation for the length of the cable connecting the ship to the load-carrying device.

Another object of the invention is to increase the precision of the approach maneuver of the above-mentioned system, especially in case of great depths, by equipping the load-carrying device with telemetry apparatus as well as location and transmission apparatus, and by equipping the surface vessel with reception and remote-control apparatus, said remote-control apparatus controlling the means for the orientation of the load-carrying device.

Another object of the invention is to make the device economical and light by using power generation equipment on board the surface vessel and by transmitting information between the device and the ship as well as by transmitting the electric power necessary for the operation of the apparatus on the device and for its propulsion motor, using an electric power-conducting cable.

Another object of the invention is to provide a load-carrying device of the type described above including means for hooking or catching the transported load controlled by the remote-control apparatus.

Another object of the invention is to provide a device as described above which has great maneuverability, said device involving a tubular hull in its horizontal axis, a propulsion motor forward, a vertical rudder aft of the tubular hull, keels fore and aft, an enclosure carrying the measurement and control apparatus, as well as means for hooking the cable of the ship and means for hooking the load.

Another object of the invention is to increase the precision of the release or jettisoning of the load transported by the above mentioned device, by making the load-carrying element mobile with respect to the device, the opening of the hooks holding the load being remote-controlled.

Other advantages and features will emerge from the following specifications made with reference to the attached drawing which, by way of nonrestrictive example, presents one way of implementing this invention.

Figure 2:
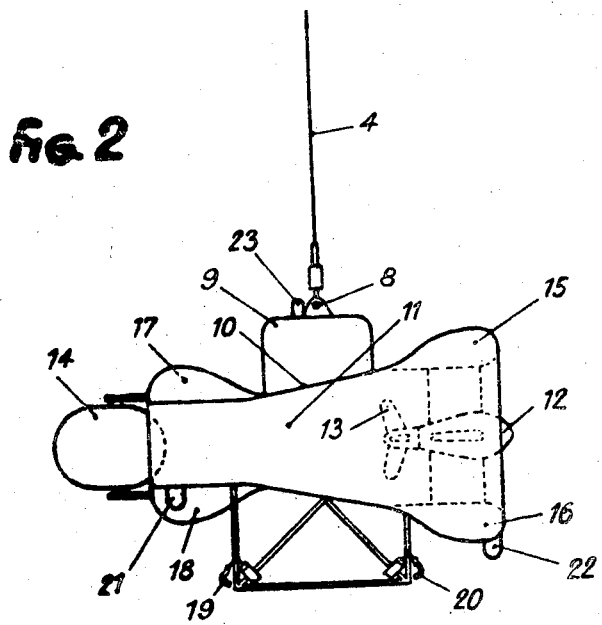

In the drawing:

FIG. 1 shows the basic diagram of the load-transporting system according to the invention, and FIG. 2 is a schematic elevation view of the load-carrying device.

Referring to the drawings, the load 1 is to be deposited on emplacement 2 situated on ocean bottom 3. Instead of directly carrying the load by cable 4, supported by crane 5 on surface ship 6, load 1 is tied to carrying device 7.

The ship may be equipped with conventional devices for telemetry and for the spotting of the emplacement 2. The latter may also be equipped, as the case may be, with various transmitting devices. When a ship has approached as closely as possible to the vertical of the place where the load is to be deposited, for example, the head of a submarine petroleum well, the control winch of cable 4 is released. Because of the movements of the ship and the submarine currents, the load-carrying device may drift and may move considerably away from the vertical. For example, a load of even 10 tons may drift several meters during descent, so that this interval, added to the imprecision of the position of the ship with respect to the vertical of the selected emplacement, may lead to horizontal distances between the load and the emplacement amounting to more than 30 meters for a depth on the order of 500 meters.

According to the invention, a device 7 is provided equipped with a propulsion means and an orientation means, capable of being controlled on the basis of measurements taken so as to spot the position of the device with respect to the emplacement considered.

If the depth is shallow and the spotting equipment on the ship so permit, a device whose orientation and propulsion means are remote-controlled by the ship as a function of surface measurement results may suffice.

If, on the other hand, the depth is too great, the device itself may be equipped with spotting and measurement means, the results of these measurements being transmitted to the ship for the remote control of the device. These results may also be used for directly controlling the propulsion and orientation elements of the device when the latter has its own automatic control system.

In both cases, the presence of an operator on board the device or on board an auxiliary submarine used in watching the maneuver is avoided.

According to the invention, cable 4 is an electric power cable enabling us not only to carry the device and its load but also to transmit the measurement results for the remote-control of the device, as well as the power necessary for keeping the instruments on board the device going and for keeping up the power in its own motor.

When the load carried by device 7 is right above emplacement 2, as in the position shown by dots in FIG. 1, the spotting elements transmit a command that initiates the placement of the load and then the opening of the carrying hooks. The device is then raised back up again and it is available for another operation.

In order to make the device more suitable for such a mission while still reducing its weight and its cost, any equipment making it capable of maintaining itself at an arbitrary level in the water is eliminated.

In the example shown in FIG. 2, the device involves the following: an attachment device 8 for attachment to the electric power cable 4, an enclosure 9 for the purpose of housing the measurement, control, transmission, and remote-control instruments, a hull 10 with a tubular shape containing in its axis 11 and in the forward portion a propulsion motor 12 with its screw 13, a vertical rudder 14 on the stern of the tubular hull, forward keels 15 and 16 and aft keels 17 and 18, as well as remote-control hooks, such as 19 and 20.

Two sonar-telemeters are shown at 21 and 22, as well as an ultrasonic transmitter 23 for positioning control signals.

The arrangement of the rudder at one end of the tubular hull opening enables efficient guidance and control of the device.

Since the weight of the motor and the load as well as the horizontal traction effect exerted by the motor contribute to tensing the cable an auxiliary element may be added to the carrying device to lower the remote-controlled load fixation hooks and to displace the load forward or aft with respect to the device.

It is clear that the invention may be implemented in a wide variety of forms and that numerous modifications can be made in the carrying device itself without going beyond the framework of this invention.

What is claimed is:

1. A system for depositing loads at precise locations in the bottom of a body of water, comprising in combination:
   a. a surface ship,
   b. a submarine load-carrying device comprising:
      1. a tubular hull open at both ends and having a horizontal longitudinal axis,
      2. a propulsion motor mounted in one end of the hull,
      3. guidance means including a vertical rudder mounted in the other end of the hull,
      4. forward and aft keels mounted on the hull,
      5. an enclosure for housing measuring and control apparatus,
      6. means for attaching to a cable, and
      7. hook means for releasably carrying a load, and
   c. a cable connected between the ship and the attaching means.

2. A system as defined in claim 1 further comprising:
   a. means on the ship for locating zones on the bottom, and
   b. means on the ship for remotely controlling the guidance means.

3. A system as defined in claim 1 further comprising:
   a. means on the ship for determining its position with respect to a fixed object and with respect to the bottom, and
   b. means for regulating the length of the cable connecting the ship and the load-carrying device.

4. A system as defined in claim 1 further comprising:
   a. means on the device for determining its position with respect to a bottom zone,
   b. means on the device for transmitting position information to the ship,
   c. means on the ship for receiving the position information, and
   d. means on the ship remotely controlling the guidance means.

5. A system as defined in claim 1 wherein the cable is an electric power and carrying cable for transmitting information signals between the device and the ship and for supplying electrical power to the device.

6. A system as defined in claim 1 further comprising:
   a. means on the device for determining its location with respect to a target area on the bottom, and
   b. means on the device for controlling the propulsion motor, the guidance means and the load carrying means in response to the location determining means.

7. A system as defined in claim 1 further comprising means for moving the load-carrying means with respect to the device.

* * * * *